United States Patent

Bradley et al.

[11] Patent Number: 5,853,143
[45] Date of Patent: Dec. 29, 1998

[54] AIRBREATHING PROPULSION ASSISTED FLIGHT VEHICLE

[75] Inventors: Marty K. Bradley, Downey; Kevin G. Bowcutt, Irvine; Harry Shortland, Torrance; Philip S. Dunlap, Rancho Palos Verdes, all of Calif.

[73] Assignee: Boeing North American, Inc., Seal Beach, Calif.

[21] Appl. No.: 771,499

[22] Filed: Dec. 23, 1996

[51] Int. Cl.⁶ .............................. F42B 10/32; F42B 7/10
[52] U.S. Cl. ...................... 244/3.21; 60/270.1; 102/374
[58] Field of Search ................ 60/270.1; 244/3.22, 244/3.21; 102/374

[56] References Cited

U.S. PATENT DOCUMENTS

| | | | |
|---|---|---|---|
| 3,535,882 | 10/1970 | Tizio et al. | 60/270.1 |
| 3,635,030 | 1/1972 | Schubert et al. | 60/251 |
| 3,708,139 | 1/1973 | Wheeler | 244/3.13 |
| 3,901,028 | 8/1975 | Leingang | 60/225 |
| 4,291,533 | 9/1981 | Dugger et al. | 60/240 |
| 4,327,885 | 5/1982 | Blevins et al. | 244/3.24 |
| 4,338,783 | 7/1982 | Leingang | 60/225 |
| 4,369,940 | 1/1983 | Kelly et al. | 244/3.21 |
| 4,428,293 | 1/1984 | Botwin et al. | 102/381 |
| 4,537,371 | 8/1985 | Lawhorn et al. | 244/3.22 |
| 4,539,911 | 9/1985 | Flatau | 102/374 |
| 4,614,318 | 9/1986 | Gobel | 244/3.21 |
| 4,896,502 | 1/1990 | Ravel et al. | 60/270.1 |
| 5,067,406 | 11/1991 | Olson et al. | 102/374 |
| 5,154,050 | 10/1992 | Herup et al. | 60/230 |
| 5,245,927 | 9/1993 | Ranes | 102/378 |
| 5,333,445 | 8/1994 | Coffinberry | 60/270.1 |
| 5,431,106 | 7/1995 | Dunn et al. | 102/489 |
| 5,485,787 | 1/1996 | Bowcutt et al. | 102/374 |
| 5,513,571 | 5/1996 | Grantz et al. | 102/374 |
| 5,657,025 | 8/1997 | Ebner et al. | 342/357 |

OTHER PUBLICATIONS

Air Force Aero Propulsion Laboratory Technical Report AFAPL-TR-68-9, Feb. 19, 1968; Authors: H.H. King, O.P. Prachar.

*Primary Examiner*—Charles T. Jordan
*Assistant Examiner*—Christopher K. Montgomery
*Attorney, Agent, or Firm*—Lawrence N. Ginsberg

[57] ABSTRACT

The flight vehicle includes an elongated central body having a central axis defined therein and a circumference. A plurality of elongated portions are positioned about the central body. A plurality of airbreathing engines are axisymetrically positioned about the central axis of the central body and between the respective elongated portions. Each flowpath includes a forebody, an inlet, an isolator duct, a combustor, a nozzle, and a mechanism for injecting fuel into the combustor. The forebody externally compresses the air flow. The inlet is downstream of the forebody to capture air flow. The isolator duct is downstream of the inlet to further reduce velocity of the air flow. The combustor is downstream of the isolator duct and finally, the nozzle is downstream of the combustor. The fuel/air mixture is burned in the combustor and expanded in the nozzle for providing thrust. A control mechanism is positioned about the central body for providing control of the flight vehicle. The axisymetric relationship of the engines relative to the central body provides balanced forces in flight and simplifies the integration of the present invention into guns and launch tubes.

34 Claims, 8 Drawing Sheets

AIRBREATHING PROPULSION ASSISTED FLIGHT VEHICLE

BACKGROUND OF THE INVENTION

1. Field of the Invention

The present invention relates to high speed projectile-like or missile-like flying vehicles that attain initial flight preconditions through rocket boost, gun launch, artillery launch, or high-speed aircraft release; and more particularly to air-breathing propulsion assisted flight vehicles which accelerate beyond initial launch velocities using ramjet, scramjet, or ramjet/scramjet propulsion to enable flight at supersonic, hypersonic, or supersonic/hypersonic velocities.

2. Description of the Related Art

The ramjet and supersonic ramjet (scramjet) propulsion cycles for supersonic (less than Mach 5) and hypersonic (Mach >5) engines are well-known within the art of aerospace propulsion. These engines are typically defined by an external compression device or forebody, and internal compression device such as an inlet including an isolator and/or diffuser, a combustion device or combustor, and an expansion device or nozzle. All surfaces wetted by flow streamlines ultimately passing through the engine are considered to be a part of the engine flowpath since they contribute to the engine cycle performance. Consequently the integration of the airframe and the propulsion systems for vehicles or projectiles employing these propulsion cycles is critical for high performance.

In the ramjet propulsion cycle, high-velocity air is compressed and captured through a series of forebody and inlet shocks and further compressed through a subsonic diffuser, all of which decelerate the air to a subsonic velocity near the fuel flame speed. Fuel is injected into a combustor and conventional subsonic combustion occurs, thereby increasing the temperature and pressure of the flow. The high pressure gas is then expanded through a nozzle, increasing the velocity and momentum of the flow to produce thrust. This cycle is efficient for freestream Mach numbers ranging between approximately 2 and 5. However, for freestream velocities above about Mach 5, the temperatures and pressures associated with decelerating the flow to subsonic speeds for combustion are severe and begin eroding engine cycle and/or structural performance.

In the ramjet propulsion cycle above about Mach 5, the static temperature at the combustor entrance approaches the stagnation temperature and dramatically impacts fuel combustion. At such extreme temperatures, an appreciable amount of the energy which would be released due to combustion is bound in dissociated air and combustion product molecules such that the temperature rise due to combustion is reduced. The energy contained in dissociated gases is largely unavailable for the expansion and acceleration of the exhaust mixture. Thrust, therefore, is lost as a result.

For Mach numbers above 5, scramjet engines generate high propulsion efficiency. Above Mach 5, the main advantage of scramjet propulsion is that supersonic velocities within the combustion chamber are accompanied by lower static temperatures, lower pressures and reduced total pressure losses. These lower temperatures, pressures and losses thereby reduce combustion product dissociation, and the reduced temperature gases when expanded yield increased cycle efficiency. Above Mach 5, the scramjet engine has reduced pressures which decrease loads on engine structure and reduced total pressure losses (entropy gains) which increase the flow energy available for thrust production (i.e., increased efficiency).

A large number of parameters impact the specific impulse ($I_{sp}$, or thrust per pound of propellant) performance of ramjet and scramjet systems. They include, but are not limited to: the forebody and inlet contraction ratios, the inlet efficiency, the fuel mixing efficiency, the combustor efficiency and the nozzle efficiency.

The purpose of the inlet is to capture a desired quantity of air flow and deliver it to the combustor at a desired pressure and Mach number with a minimum of entropy producing losses. The technology and parameters necessary to successfully design and operate an efficient supersonic inlet are documented but difficult to capture in a single design. The mass flow captured by the inlet compared to the drag of the vehicle must be sufficiently large so that a net thrust can be expected across the entire Mach number range of operation for achievable values of ramjet or scramjet $I_{sp}$ performance.

The isolator is located between the inlet and the combustor entrance, and is necessary to adjust flow static pressure from that of the inlet exit to the higher combustor pressure downstream during ramjet and early scramjet ("dual-mode") operations. When combustor pressure rise is large and inlet Mach numbers low, as in ramjet operation, boundary layer separation in the combustor can lead to inlet interaction and engine unstart. An isolator permits a shock train to develop between the inlet and combustor with a near normal shock static pressure rise without any upstream inlet interaction. The length of the isolator is critical to carrying out this function.

The combustor provides the physical domain for injecting a liquid or gaseous fuel into high velocity air and mixing the fuel and air for combustion. The fluid and chemical phenomena present in the combustor are extremely complex and include the effects of laminar and turbulent mixing of fuel injection jets with boundary layers and core flows, and the finite rate chemical kinetics of the exothermic combustion reactions. Fuel ignition and flameholding are also important issues. Typical design parameters include the fuel injection geometry, mixing enhancement devices, the length of the combustor required to achieve the high mixing and combustion efficiencies necessary for high $I_{sp}$ performance across the Mach number range of interest. Fuel injection location and mixing rate (i.e., distribution of heat release) is also important for controlling if and where flow choking (Mach 1) occurs in the combustor. Fuel is generally injected in the aft section of the combustor in ramjet mode, both fore and aft in dual-mode (combined supersonic and subsonic combustion), and forward in scramjet mode.

The nozzle or expansion system, typically comprising internal and external nozzles, is important to the specific impulse ($I_{sp}$) of the projectile because it produces thrust by accelerating the high static pressure flow exiting the combustor to lower pressure and high velocity (i.e., momentum). The objective is to expand the high pressure flow to the lowest pressure possible using a shape that minimizes the combination of friction losses, chemical recombination losses, and flow divergence (angularity) losses.

The ratio of the nozzle expansion area to the inlet capture area and the ratio of inlet mass flow to non-flowpath drag are critical figures-of-merit in designing a system which produces a flowpath thrust that exceeds the non-flowpath drag and therefore produces acceleration. Balancing the geometric details required for high propulsive efficiency, thrust and low vehicle drag is the traditional challenge inherent in ramjet and scramjet vehicle design.

Methods to improve the range and velocity performance of gun or artillery launched projectiles have been investigated since the earliest development of these devices. Gun projectile velocities are ultimately limited by the speed of sound in burned propellant gases. Therefore, methods for accelerating the projectile after it leaves the barrel have also been investigated.

One approach successfully developed and commonly used today is that of a rocket-assisted projectile. A rocket motor containing a solid or liquid propellant is incorporated into the base of the projectile and ignited after leaving the barrel. The range and acceleration potential of these rocket assisted projectiles is rather limited due to the small amount of fuel which can be carried and the relatively low $I_{sp}$ which can be produced by a rocket motor in comparison to an air-breathing ramjet or scramjet propulsion cycle.

Research in supersonic air-breathing propulsion systems for aircraft and missiles has been in progress since the 1940's. As empirical knowledge grew in the late 1950's, researchers investigated propulsion for hypersonic aircraft and missiles using scramjet engines. Research into scramjet propulsion continued during the 1970's at the NASA Langley Research Center, and in the 1980's and 1990's grew considerably under the auspices of the National Aerospace Plane (NASP) program.

U.S. Pat. No. 4,291,533 to Dugger et al. describes a rocket-launched scramjet powered missile. Typical gun-launched projectile accelerations of tens of thousands times greater than the acceleration of gravity (g) far exceed the approximately hundred-g acceleration of a typical high performance rocket booster, and consequently would prevent directly adapting the missile design described or any other missile to gun launching to the velocity required to initiate a ramjet or scramjet engine.

Application of ramjet propulsion to gun-launched projectiles have been described by Olson et al. in U.S. Pat. No. 5,067,406 and by Flatau in U.S. Pat. No. 4,539,911. These patents considered tubular projectiles utilizing a solid propellant. These concepts focused on producing thrust which essentially balanced the aerodynamic drag in order to reduce the deceleration of the projectile as opposed to accelerating beyond the muzzle velocity. The light weight construction of these projectiles also severely constrains the gun-launched acceleration loads which the projectiles can survive and restricts the muzzle launch velocity. The flowpath through the center of the projectile also limits the fuel which can be used to generate thrust and overcome aerodynamic drag. These concepts cannot carry a payload of significant volume or size due to interference with the propulsive flowpath.

Botwin et al., in U.S. Pat. No. 4,428,293, address the payload and fuel volume issues of the previously referenced patents to Olson et al. and Flatau. However, Botwin specifically discloses that the ramjet powered projectile is designed to maintain a thrust-to-drag balance such that it follows a predetermined vacuum ballistic trajectory.

A scramjet system launched from a light gas gun for scramjet propulsion testing and experiments in a closed test chamber was documented in 1968 by H. H. King and O. P. Prachar in the Air Force Aero Propulsion Laboratory Technical Report AFAPL-TR68-9. This study represents the only known attempt to launch a scramjet-shaped projectile from a gun barrel, and was conducted to investigate issues pertaining to launch and acceptable free flight of an annular combustor scramjet model. The scramjet model was too small to include a fuel system, and was therefore limited to unfueled launches to verify structural integrity and aerodynamic stability. Fuel systems were tested separately in simple cones only, not in scramjets.

The design of the model included an internal contraction ratio (i.e., the ratio of the inlet area at the cowl leading edge to the minimum flow area downstream of the cowl leading edge) of unity for positive inlet starting characteristics, but with a very low airflow capture area to drag ratio with the result that a net thrust or positive acceleration could not be produced even if it was fueled.

U.S. Pat. No. 4,896,502, issued to Ravel et al., discloses use of a plurality of inlets, which direct flow into a single central combustor, thereby employing only one ramjet engine.

U.S. Pat. No. 4,369,940, issued to Kelly et al., again discloses only one ramjet engine. The engine is non-axisymetrically positioned.

U.S. Pat. No. 5,485,787, issued to Bowcutt et al., discloses a gas gun-launched, propulsion assisted scramjet projectile adapted to be fired from a gun, preferably at velocities greater than Mach 5. The projectile includes a body with an external compression section, an internal compression section, a combustion section, a nozzle section, a means for channeling ambient fluid to an engine in one of the sections of the body, the channeling means and the body cooperating with the engine to produce thrust greater than drag when the projectile travels at velocities greater than Mach 5.

U.S. Pat. No. 5,513,571, issued to Grantz et al., discloses an air-breathing, propulsion assisted projectile designed to be rocket or gun launched and capable of accelerating to hypersonic velocities. The projectile includes a body having an encompassing cowl, and air compression section, an engine assembly located adjacent the air compression section, and a nozzle section located adjacent the engine assembly.

OBJECTS AND SUMMARY OF THE INVENTION

It is therefore a principal object of the present invention to provide an airbreathing propulsion assisted flight vehicle capable of travel at hypersonic velocities which has internal fuel, and control and payload interfaces which allow the flight vehicle to perform as a high-speed weapon or transportation system.

This and other objects are achieved by the airbreathing propulsion assisted flight vehicle of the present invention. The flight vehicle includes an elongated central body having a central axis defined therein and a circumference. A plurality of elongated portions (i.e. integration channels) are positioned about the central body. A cowl is positioned about at least a portion of the central body. A plurality of airbreathing engines are axisymetrically positioned about the central axis of the central body and between the respective elongated portions. Each engine includes a forebody, an inlet, an isolator duct, a combustor, a nozzle, and a mechanism for injecting fuel into the combustor. The forebody externally compresses the air flow. The inlet is downstream of the forebody to capture air flow. The isolator duct is downstream of the inlet to further reduce velocity of the air flow. The combustor is downstream of the isolator duct and finally, the nozzle is downstream of the combustor. The fuel/air mixture is burned in the combustor and expanded in the nozzle for providing thrust. A control mechanism is positioned about the central body for providing control of the flight vehicle.

The axisymetric relationship of the engines relative to the central body provides balanced forces in flight and simplifies the integration of the present invention into guns and launch tubes.

By laterally tailoring the elongated portions, the flow path area can be readily varied as needed to produce optimum engine performance. The elongated portions allow for integration of components, such as spindles, antennae and other external interfaces in a relatively cool environment. By placing the flow path outside the central body, the integrity of and packaging efficiency in the central body are maximized. This provides a mechanism to readily insulate temperature sensitive components in a central body from the relatively high temperatures in the flow paths.

Other objects, advantages and novel features of the present invention will become apparent from the following detailed description of the invention when considered in conjunction with the accompanying drawings.

DETAILED DESCRIPTION OF THE PREFERRED EMBODIMENT

Figure 1:
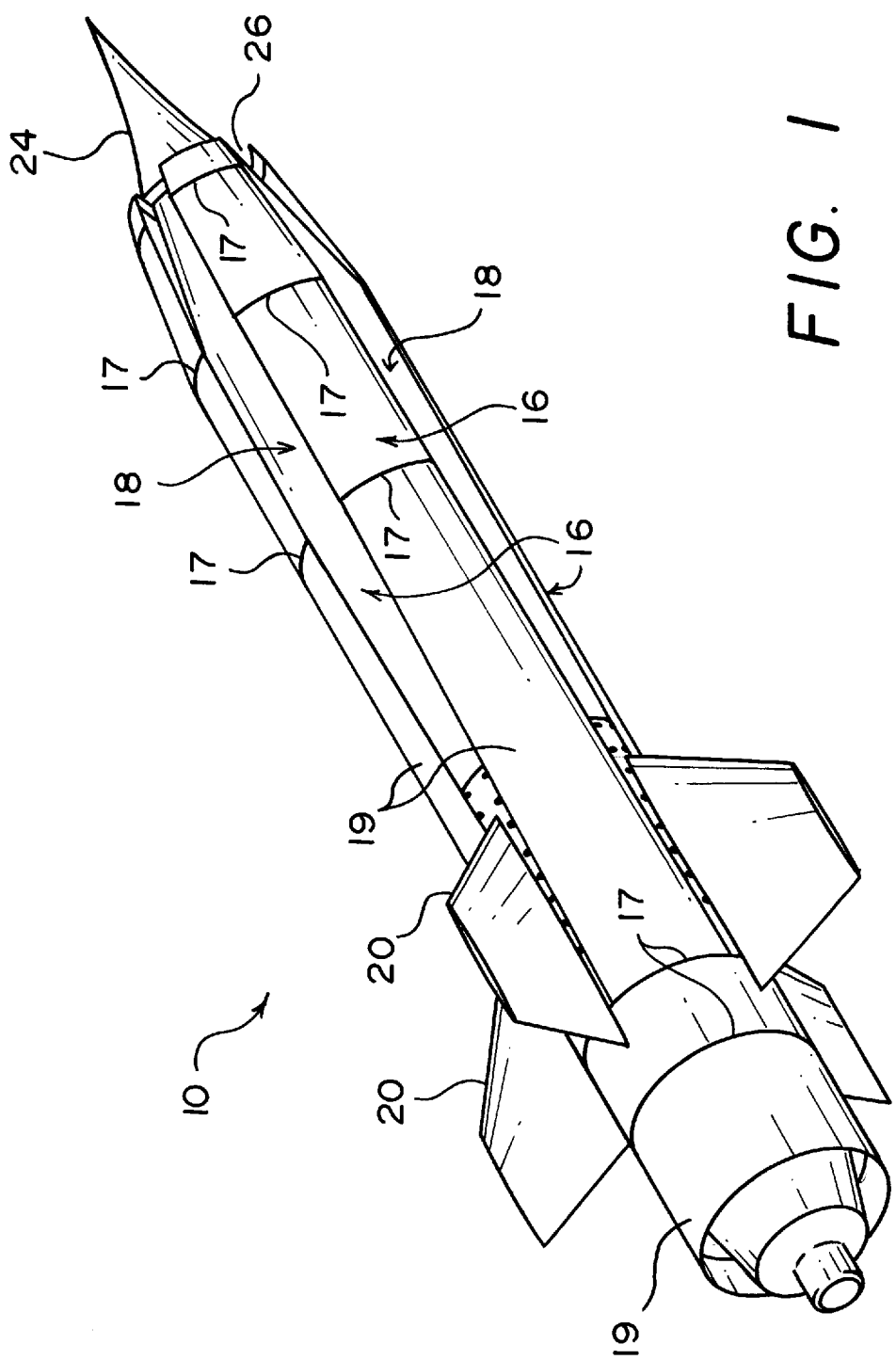
FIG. 1 is a perspective view of a first embodiment of the hypersonic airbreathing propulsion assisted flight vehicle according to the present invention.
Figure 2:
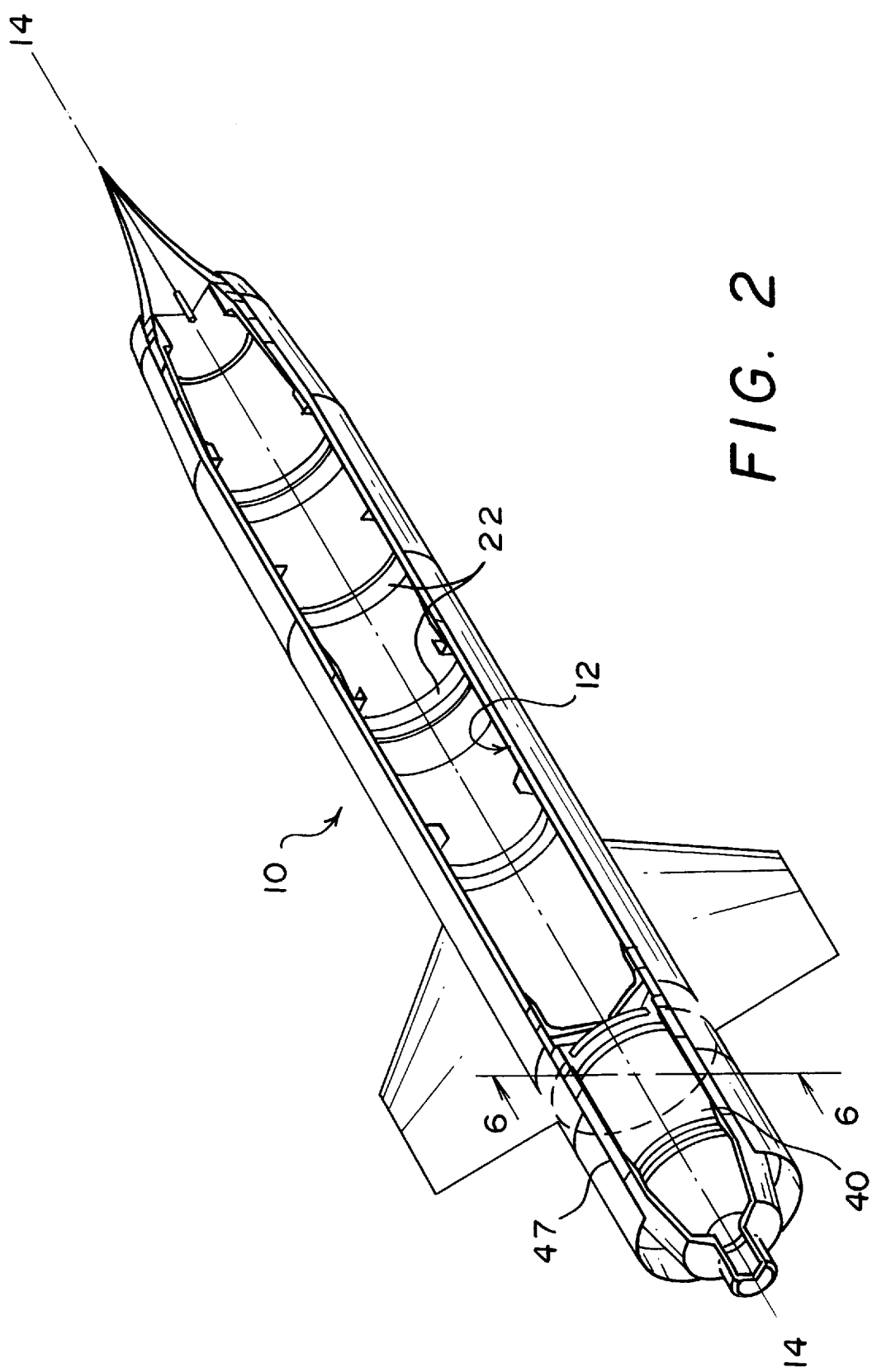
FIG. 2 shows a cutaway perspective of the FIG. 1 embodiment, with some of the central body components omitted for the purpose of clarity.

Referring now to the drawings and the characters of reference marked thereon, FIGS. 1 and 2 illustrate a preferred embodiment of the present invention, designated generally as 10. The flight vehicle 10 includes an elongated central body 12 (see FIG. 2) having a central axis 14 defined therein and this elongated central body has a cross-section with a circumference that will be discussed further in more detail below.

A plurality of airbreathing engines 16 are axisymetrically positioned about the central axis 14 of the central body 12. (It is noted that the flowpaths run the length of the vehicle. The lines 17 in this figure are merely engineering producability segments, which have been added to illustrate the curvature.) A plurality of elongated portions 18 are built up in positions between the airbreathing engines 16. These elongated portions 18 define the structure through which pass conduits, interfaces to the engines 16 and external interfaces, which will be discussed below in greater detail. A cowl 19 is positioned about at least a portion of the central body and is supported by the sidewalls of the engine. Alternately, each of these elongated portions 18 can be built up as a separate unit and collectively define the sidewalls of the engines. Portions of the cowl 19 can be used to bridge the sidewalls of the engines and thus define upper walls of the engines to create a complete flow path. Control means, such as fins 20, provide control of the flight vehicle 10. The fins are supported by the elongated portions 18.

The central body 12 provides a structural framework to which the engines are attached or integrated. A payload, a control system, a guidance system and a fuel system are contained inside the central body 12. The central body 12 also provides insulation from environmental conditions created by flight vehicle high speed and engine high temperature flow. The central body 12 is preferably of a circular cross-section although other geometric shapes may be used such as oblong shapes or polygonal shapes. (See discussion regarding FIG. 3d, below).

Referring now to FIG. 2, suitable material for use as the central body 12, include a multitude of high temperature resistant metal alloys or composites, for example, Inconel™ or steel. Stiffeners 22 are provided along longitudinal segments of the central body 12 to provide structural integrity. The central body 12 can be developed such that it supports separate bays for control, guidance, payload and other functions, or, it can be developed in an integrated fashion.

As noted above, the central body 12 provides a structural backbone for the flight vehicle. Referring to FIG. 1, the elongated portions 18 are positioned about the central body 12. The elongated portions may be developed by building up a structure between the engines or by manufacturing a structured object that is attached to the central body. Alternately, the elongated portions 18 may be developed as an integral portion of the central body 12.

Yet another method to develop the elongated portions 18 would be to develop the engines first and then use the structural sides in the engines to support the cowl. In other words, the elongated portions are formed by the sides of the plurality of airbreathing engines.

The elongated portions 18 are formed of a similar resilient structural material such as the central body, such as, for example, steel. The cowl provides structure for the outside of the flow path of the engines.

Figure 3A:
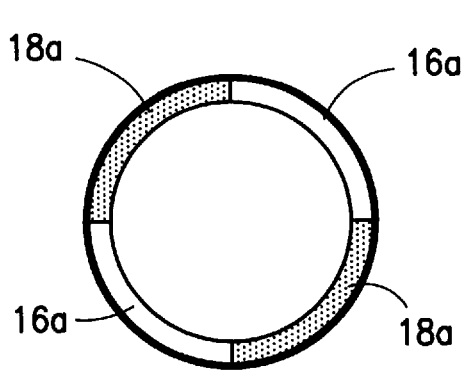
FIGS. 3a–3d are schematic cross-sectional cutaways of several options of flowpath/elongated portions for desired symmetry, engine plurality and shape.

Referring now to FIGS. 3a–3d, various examples of the axisymetric relationship between the plurality of engines and the central body are illustrated. In FIG. 3a, there are two opposing engines 16a and two opposing elongated portions 18a, forming a four-fold axis of symmetry.

Figure 3B:
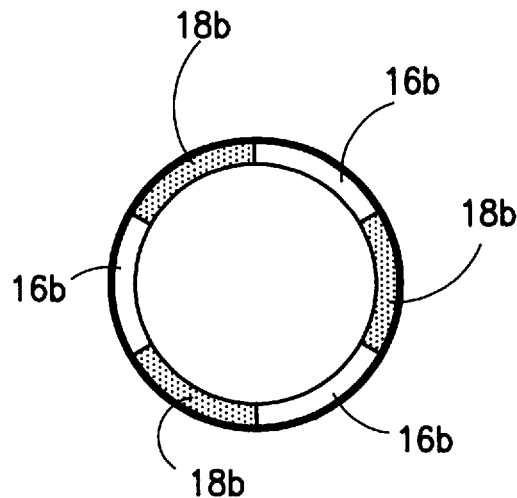
Figure 3C:
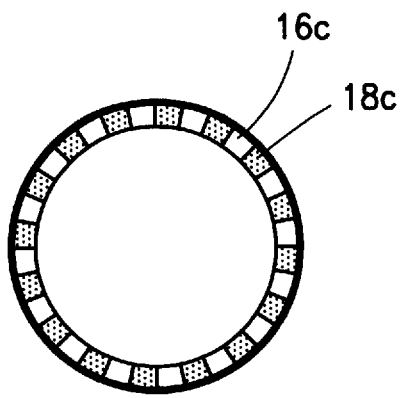

FIG. 3b shows three engines 16b and three opposing elongated portions 18b forming a three-fold axis of rotary reflection. FIG. 3c shows sixteen engines 16c and sixteen elongated portions 18c illustrating a 32-fold axis of rotary reflection.

Figure 3D:
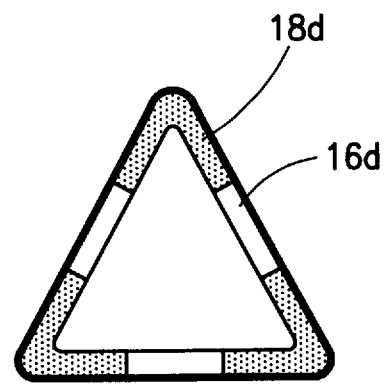

FIG. 3d illustrates that the inventive concepts herein are not limited to a circular cross-sectional shape. It shows a polygonal shape comprising three engines 16d and three elongated portions 18d in a three-fold axis of rotary reflection.

Figure 4:
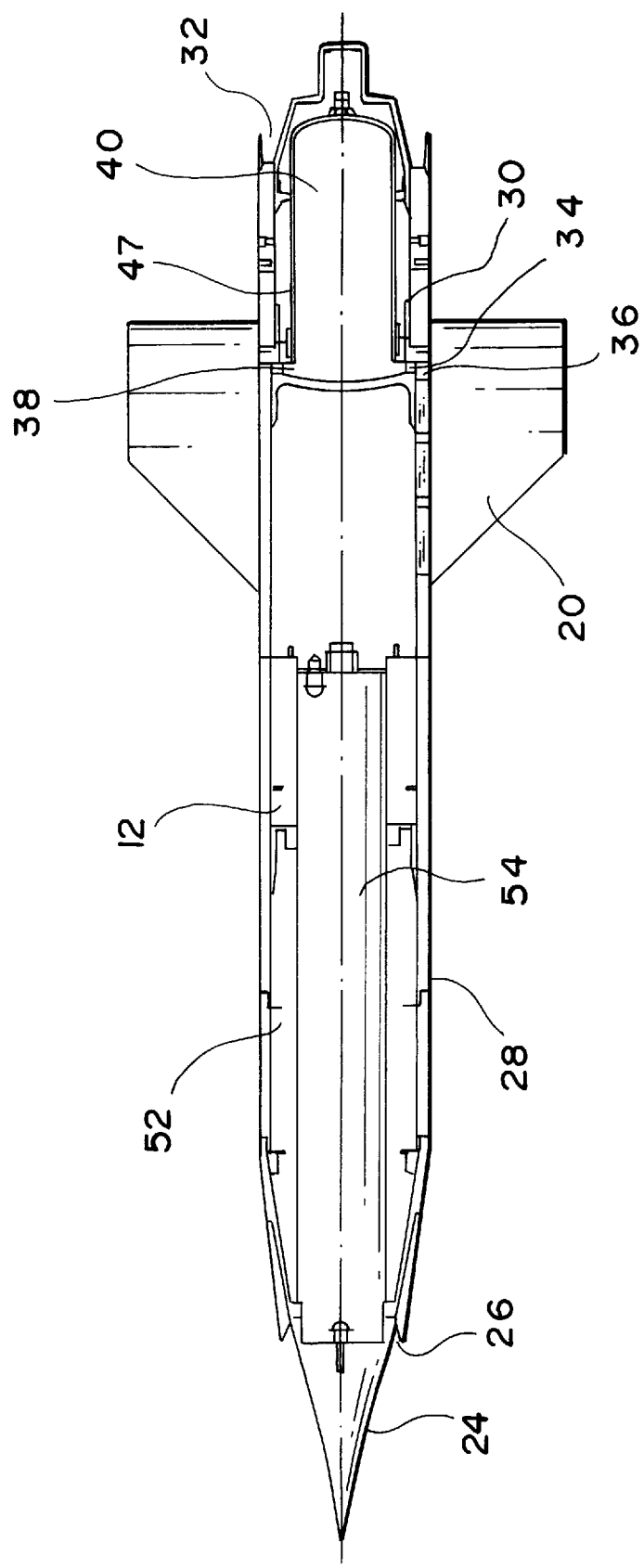
FIG. 4 is a cutaway side view of another embodiment of a hypersonic air breathing propulsion assisted flight vehicle according to the present invention.

Referring now to FIG. 4, the flowpath for one of the airbreathing engines is as follows:

A forebody 24, which is rigidly secured or integral with the central body 12 externally compresses airflow. The forebody 24 is optimally shaped to compress the flow. As depicted in this figure, the forebody 24 is conical with an isentropic ramp. (The FIG. 5 embodiment, as will be discussed below, has a forebody with a conical shape.) The forebody 24 may be made of a similar material as the central body 12.

Leading edges of the forebody 24 may be conditioned so as to survive flight conditions for longer duration and higher speeds. The forebody 24 serves to compress air that will be captured at the inlet 26. Depending on flight vehicle speed and performance, the compression ratio must be designed to condition air entering the mouth of the inlet. The forebody 24 also serves to provide aerodynamic shaping for the vehicle as it flies through the air. The forebody 24 may be weighted to position the center of gravity for vehicle stability. In addition, when the airbreathing propulsion assisted flight vehicle is employed as a weapon, the shape, material and mass of the forebody may assist in target penetration.

The inlet 26 is positioned downstream the forebody 24. When the vehicle 10 is in hypersonic flight, the inlet 26 serves to capture air compressed by the forebody 24. The inlet 26 is shaped so that its leading edge overhangs the trailing edge of the forebody 24. When the flight vehicle is flying at hypersonic speeds, the leading edges of the inlet 26 are impinged by the air and, thus, must survive aerodynamic interaction. Therefore, the leading edge structure should be stiff and be capable of sustaining shock and thermal heating in this flight regime.

Figure 6:
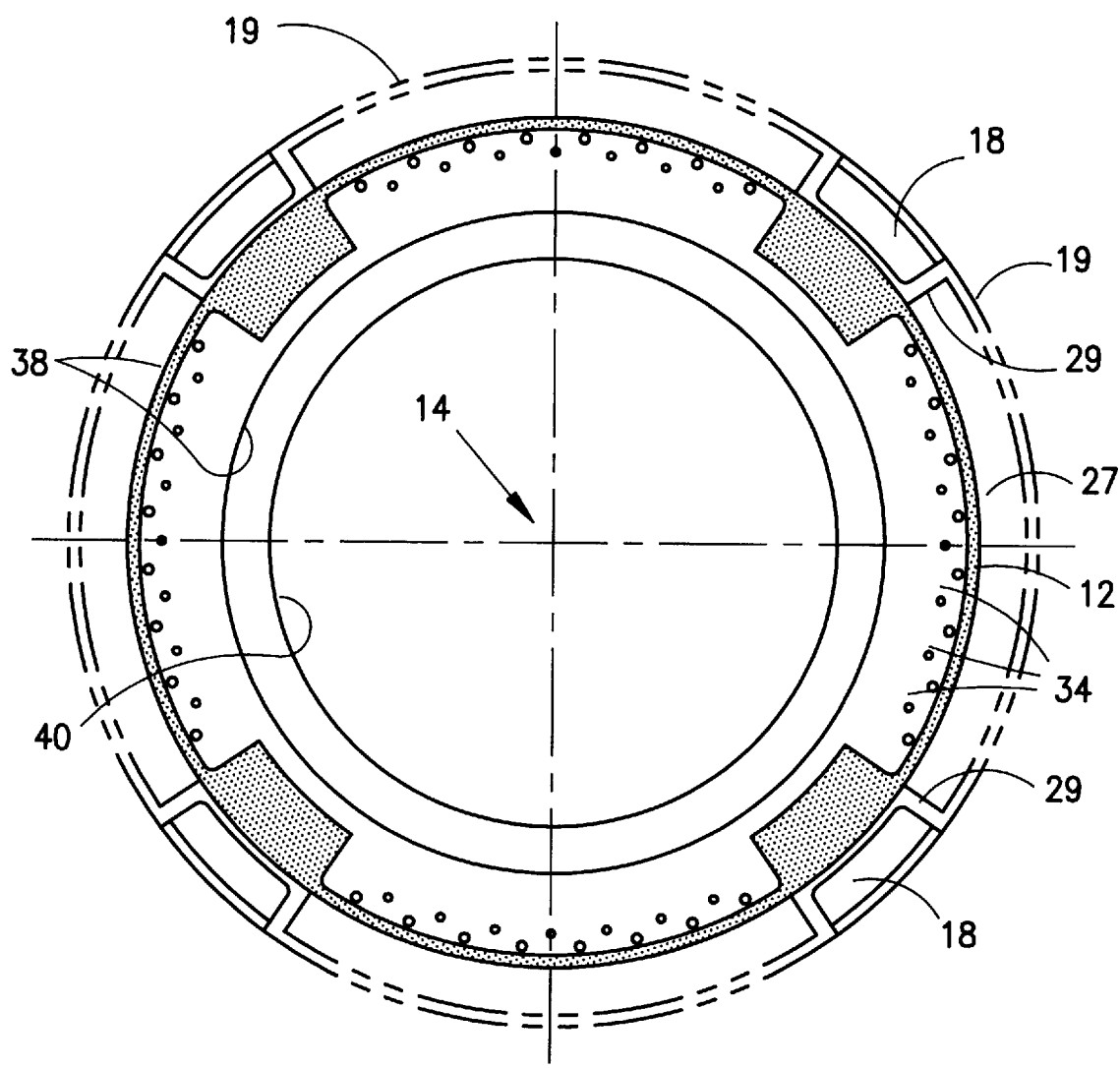
FIG. 6 is an axial view of the flight vehicle without fins taken along line 6—6 of FIG. 2.

Referring now to FIG. 6, it can be seen that the channels 27 forming flow paths have cross-sections with curvilinear polygonal shapes. These polygonal shapes are adjusted along the various stations along the length of the flight vehicle 10. Each polygonal shape is bounded by the outer diameter of the elongated central body 12, the internal diameter of the cowl 19 and the sidewalls 29 of the elongated portions 18.

Figure 7A:
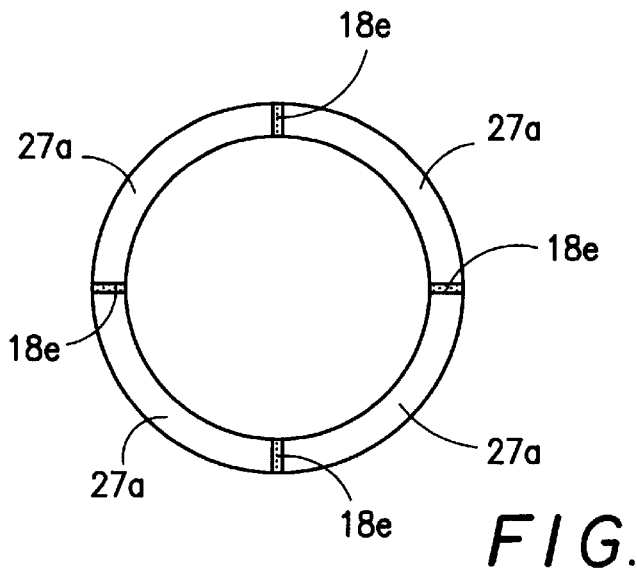
FIGS. 7a–7c are schematic cross-sectional cutaways of flowpath elongated portions to manage the cross-sectional area of the flowpath in order to control the air flow properties in the engine.

Referring now to FIG. 7a, the flowpaths 27a have been radially extended to form large cross-sectional areas compared to the elongated portions 18e. This increased cross-section is appropriate for the nozzle 32 station (see FIG. 4).

Figure 7B:
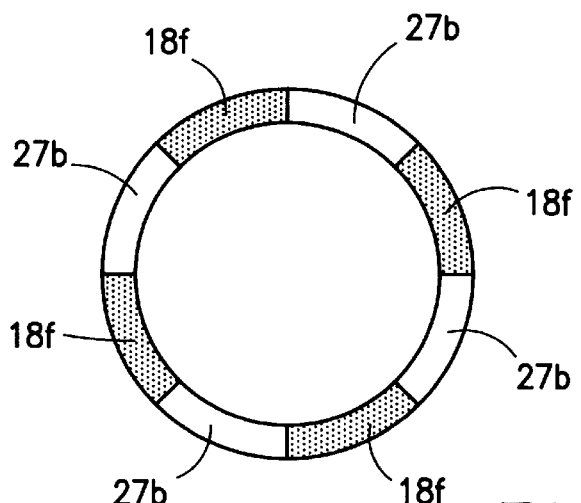

FIG. 7b shows flow paths 27b and elongated portions 18f having approximately equal cross-sectional areas. This is appropriate in the transfer duct 28 (see FIG. 4).

Figure 7C:
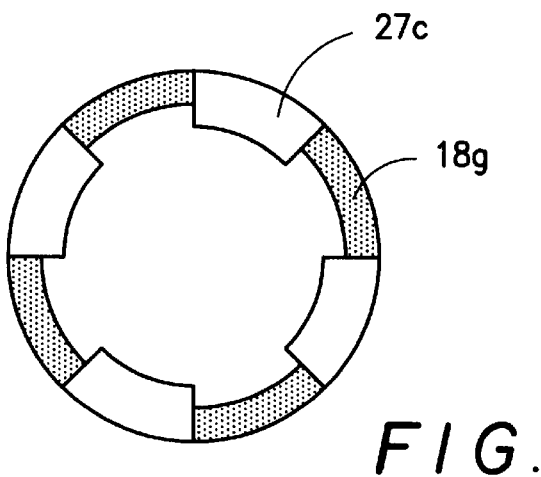

FIG. 7c illustrates how the cross-sectional area of each flow path 27c can be increased without radially extending the flowpath. This provides the capability to place critical interfaces such as GPS antennae, electronic component interfaces or mechanical interfaces, such as spindles, in the relatively cool and wide elongated portions 18g. This is appropriate for the combustor 30 station (see FIG. 4).

Again, referring to FIG. 4, the channel walls of the inlet 26 are contoured to control boundary layer separation, and to manage the desired compression ratio in the inlet channel.

The air mass captured by the inlet 26 at high speed subsequently enters a transfer duct (i.e. isolator duct) 28. Duct 28 routes the flow of air to the combustor 30. It also reduces the velocity of the flow and isolates the inlet 26 from the back pressure caused by burning in the combustor 30. In the preferred embodiment, the duct 28 is designed to reduce the velocity of the air from supersonic to subsonic by a series of shock waves.

Subsonic air flow is desired for ramjet combustor operations. (In an alternate embodiment, which uses a scramjet, the isolator duct is designed to keep the flow supersonic.)

The duct 28 is elongated. Like the inlet 26 (see FIGS. 1–2), it is bounded by the central body 12, the cowl 19 and the elongated portions 18. In order to control the velocity of the air in the duct 28, these boundaries can be shaped to provide a cross-sectional area that permits the desired flow conditions, as was discussed above with reference to FIG. 7.

Referring again to FIG. 4, downstream the ducts 28 are the combustors 30. The combustors 30 each contain injector holes 34, a flame holder 36, and a combustion duct. As are the inlets 26 and the isolator ducts 28, the combustors 30 are also bounded by the central body 12, the cowl 19 and the elongated portions 18. In the preferred embodiment, each combustor 30 cross-sectional area is increased relative to the transfer duct 28 by decreasing the width of the adjacent elongated portions and decreasing the diameter of the central body 12.

The combustors 30 provide the functions of fuel injection, fuel mixing and fuel combustion, which increases the pressure and temperature of the flow. The environment in the combustors 30 is extreme and may require special materials, such as Haynes 188™ and special processes and coatings for heat, shock and pressure interaction. In the preferred embodiment, a fuel manifold 38 is provided in the forward portion of the combustor. This fuel manifold 38 contains the injector holes 34. It is an integral part of the central body 12 and acts as the cap for a gas generator case 40. Alternately, the fuel manifold may be piping, plenum and/or plates that direct gas, liquid, gel or solid fuels into the combustor. Additionally, the combustor channels the subsonic pressurized gaseous combustion products. Nozzles 32 downstream the combustors 30 choke the flow and expand it to supersonic velocity to produce thrust. Each nozzle 32 is, in the FIG. 4 preferred embodiment, bounded by the central body and a trailing edge of the cowl.

For a flight vehicle a control system is essential, and several control system elements are provided. These include fins 20, aerodynamic shaping of the external surfaces of the flight vehicle, and center of mass positioning. This provides a passive control system for an unguided flight vehicle.

Figure 5:
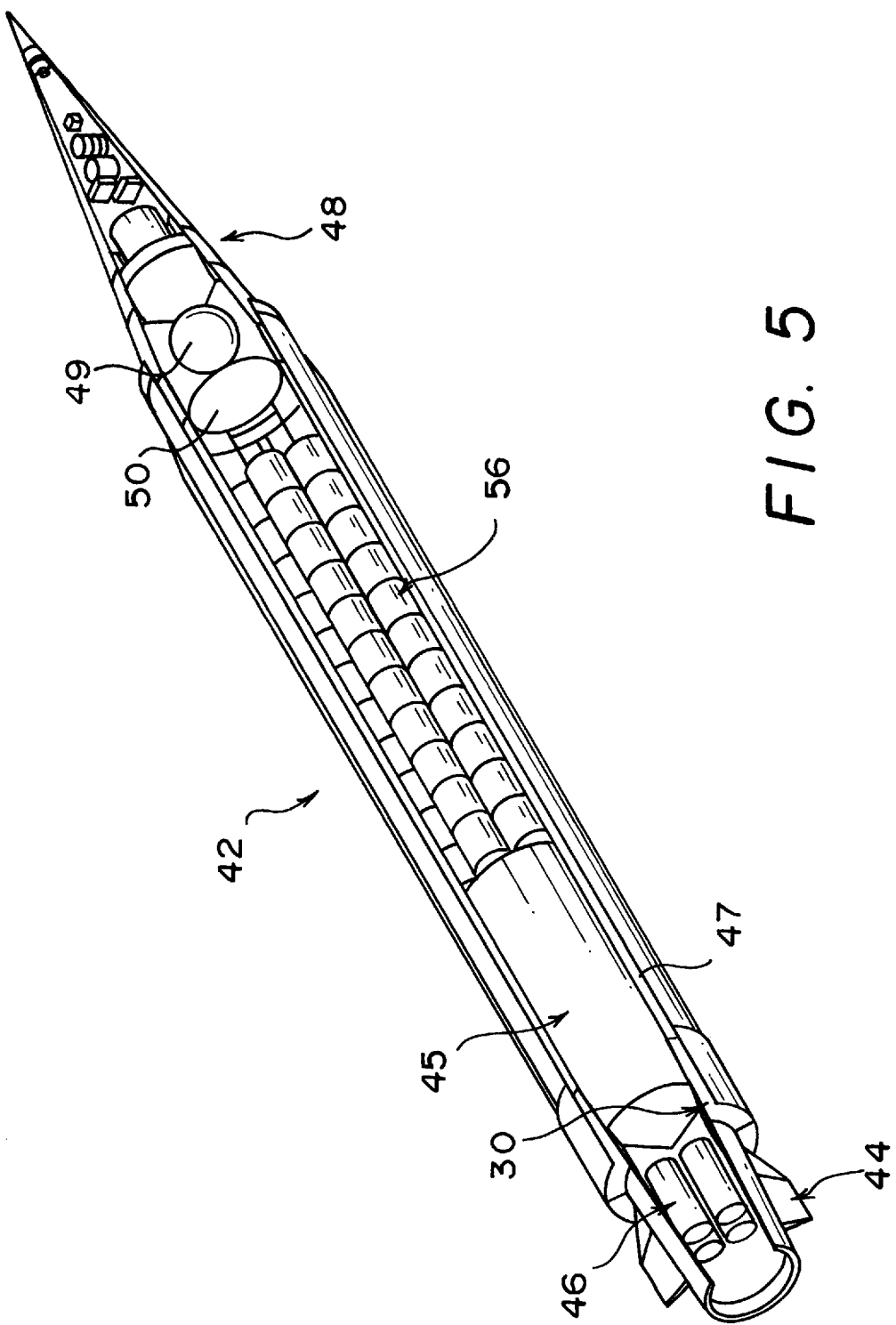
FIG. 5 is a cutaway perspective of another preferred embodiment in which the flight vehicle functions as a high-speed precision-guided weapon system.

Referring now to FIG. 5, another preferred embodiment is illustrated, designated generally as 42, in which the fins 44 are articulated by actuators 46. These articulated fins 44 can be controlled by guidance means. In the FIG. 5 embodiment the actuators are positioned in the aft portion of the central body 12. Spindles (not shown) are passed through the central body 12 structure to the flow path exhaust or to the atmosphere. Alternately, referring back to the first embodiment illustrated in FIGS. 1–2, the actuator spindles might be routed from the central body 12, through the elongated portions 18 to the atmosphere to manipulate fins 20 and thereby provide aerodynamic control. These fins might be positioned aft, in the mid-body, and/or forward (canards). Alternately, the control means may be supported by actuators and shafts (not shown) that manipulate paddles, vanes, or other control surfaces. These paddles or other control means may impinge on the flow path stream, thus providing thrust vector control. Or, they may establish flight control by interacting with the aerodynamic properties of the atmosphere. In yet another preferred embodiment, control means may be provided by jets or reaction to pyrotechnic devices.

Referring to FIG. 2, internal to the central body 12 is a fuel compartment 47. The fuel compartment 47, in the preferred embodiment, is positioned in the aftermost section of the flight vehicle. As shown in FIGS. 2 and 4, inside this compartment, is the gas generator case 40. The case 40 may require air boundary separation and/or insulation materials in order to preclude premature burning or detonation of the fuel. Alternately, the fuel compartment may be relocated and/or segmented in order to support integration of other component systems in the flight vehicle.

Referring to FIG. 5, the gas generator 45 is forward of the actuators 46 so as to support positioning of the actuators 46 in the aftermost portion of the elongated central body. The guidance means, designated generally as 48, includes a flight computer, which interacts with the actuators 46. This computer calculates the vector state of the flight vehicle and processes control commands for the actuators 46. In turn, the flight computer may be supported by a GPS/INS guidance component, command guidance, inertial navigation system or other sensing means.

The flight computer is provided with power subsystems. In addition, the flight computer may also have fuze subsystems to control payload, weapon or warhead deployment and seeker subsystems.

Still referring to FIG. 5, the flight vehicle 42 may be further supported by a communication system 50. This communication system 50 provides an interface to external systems. These external systems include pre-launch flight instruction systems, built-in-test (BIT) systems, logistics monitoring systems, and/or help and status readiness monitoring systems. In addition, these communication systems may also support in-flight communications that include in-flight instructions, navigation, telemetry, flight path assessment, and mission instruction and monitoring. Input and output ports provided for communication with the flight vehicle might include RF antenna(e) and electro-optical communications sensors and devices, as well as hard wire communication means.

Figure 8A:
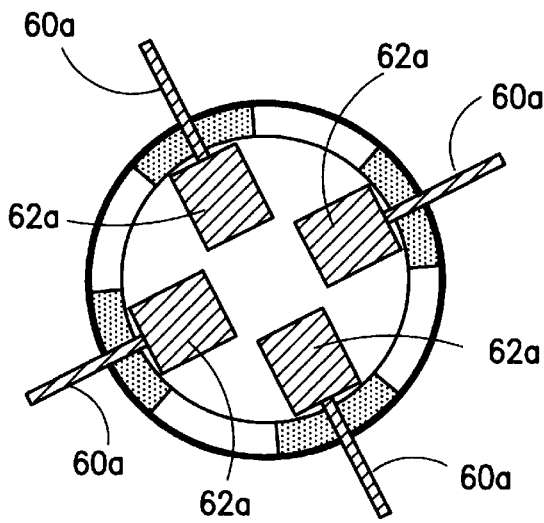
FIGS. 8a–8d are schematic cross-sectional cutaways of flowpaths and elongated portions showing techniques to manipulate the radial width of the flowpath so as to attain a mass flow cross-sectional area and yet preserve the radial width of the elongated portions to support the integration of various components/subsystems.
Figure 8B:
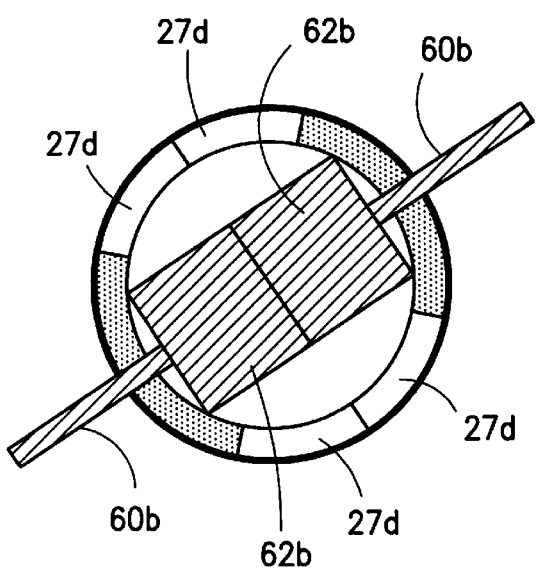
Figure 8C:
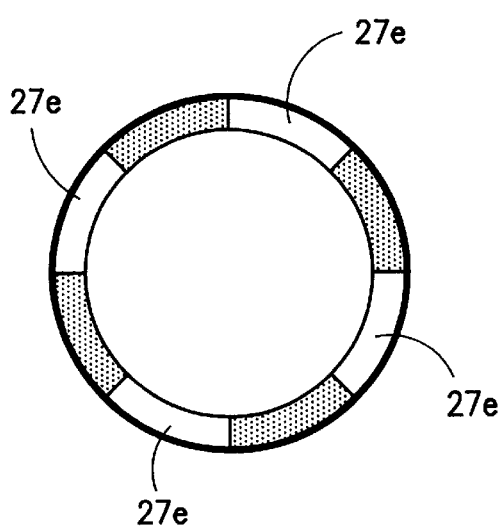

As will be discussed below with respect to FIGS. 8a–c, control components (e.g. spindles) and the ports for communicating with the flight vehicle 42 must penetrate the exterior skin of the flight vehicle. Referring to FIG. 8a, a control system using spindles 60a links control actuators 62a with the external aerodynamic environment. The spindles 60a pass through the elongated portions. In FIG. 8a, the control actuators 62a are relatively small. Referring to FIG. 8b, the control actuators 62b and the spindles 60b are relatively large. In this figure, only two control actuators 62b fit within the central body. Also note that in comparing FIGS. 8b and 8c, flowpaths 27d (FIG. 8b) may be radially routed to or from the 4-fold axis of symmetry of flowpaths 27c (FIG. 8c). In FIG. 8b, abutted neighboring flowpaths 27d allow large spindles 60b to pass through the central body at a relatively large distance from the hot flowpaths 27d.

Figure 8D:
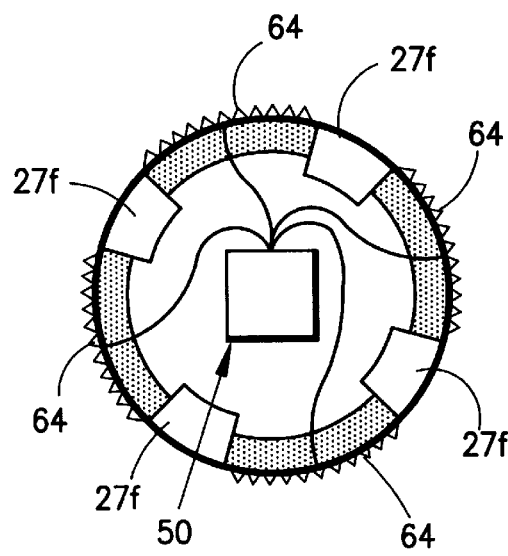

Referring now to FIG. 8d, the communications system must ultimately link the communications processor 50 with external communications sources via antennae 64. The communication processor will then route data internally to or from the flight computer, GPS/INS, telemetry system and other internal components.

Pre-flight communications may be supported by several means, including hardwire connections, and/or wireless communications. In addition to wireless communications supoprted by antennae 64, in-flight communications can also be supported by rapidly unspooled wire or other wireless communications (e.g. electro optical). In order to perform wireless communications, a receiver, such as an antenna element 64, needs to be positioned externally. Positions for the antenna may include spike or wire antenna(e) on the forebody, or leading or trailing edges of the cowl, fins, or body, or they may be patch antennae in the elongated portions, forebody, cowl or exposed sections of the central body. In addition, antennae positions may be supported by spike antennae on the nose or leading or trailing edges of the fins.

Referring again to FIG. 4, a payload bay 52 is contained within central body 12 for supporting a payload 54. Payload 54 can be, for example, a parachute or streamer recovery system, a weapons system, a weapons warhead, submunitions weapons, a weapon penetrator, high explosives, incendiaries, an unmanned air vehicle (UAV) (which is subsequently deployed), a communications system, a surveillance system, a re-supply system, a sampling system such as atmospheric probes to detect nuclear biological or chemical toxins or favorable/unfavorable atmospheres, or an exploratory payload, such as a crawler or rover. In the FIG. 5 embodiment, such a payload is depicted by numeral designation 56, representing submunitions. Integral to the payload, there may be a requirement to include insulation and thermal conditioning against aerodynamic heating and propulsive heat.

Referring, again, now to FIGS. 1–5, the outer diameter of the flight vehicle can be scaled to have an outer diameter as small as about 2.5 inches or it can have an outer diameter larger than about 23 inches. The length of the preferred embodiment can be as shorter than about 5 inches or longer than about 350 inches. This provides a large range of scaling for these flight vehicles, so they can be integrated with launcher systems and platforms.

Obviously, many modifications and variations of the present invention are possible in light of the above teachings. It is therefore to be understood that, within the scope of the appended claims, the invention may be practiced otherwise than as specifically described. What is claimed and desired to be secured by Letters Patent of the United States is:

What is claimed is:

1. An airbreathing propulsion assisted flight vehicle, comprising:
    a) an elongated central body having a central axis defined therein and a circumference;
    b) a plurality of elongated portions positioned about said central body and extending substantially the length of said central body;
    c) a plurality of airbreathing engines axisymetrically positioned about said central axis around the circumference of said central body and between and adjacent to respective elongated portions, said engines sharing a common forebody for externally compressing airflow, each engine comprising:
        i) an inlet downstream said forebody for the capture of air flow;
        ii) an isolator duct downstream said inlet to reduce the velocity of said air flow;
        iii) a combustor downstream said isolator duct;
        iv) nozzle means downstream said combustor for expanding combustion products; and
        v) means for injecting fuel into said combustor, wherein the fuel air mixture is burned in said combustor and expanded in said nozzle means for providing thrust; and
    d) control means positioned about said central body for providing control of said flight vehicle, wherein each engine's flowpath cross-sectional area dimensions at specific positions along the length of each engine are present to define the adjacent elongated portion cross-sectional area dimensions at commensurate positions along the length.

2. The propulsion assisted flight vehicle of claim 1, wherein said control means is supported by at least one of said elongated portions.

3. The airbreathing propulsion assisted flight vehicle of claim 1, wherein said elongated portions define a volume for a communication system element.

4. The airbreathing propulsion assisted flight vehicle of claim 3, further including a communication system.

5. The airbreathing propulsion assisted flight vehicle of claim 4, wherein said communication system comprises a global positioning system (GPS) antenna.

6. The airbreathing propulsion assisted flight vehicle of claim 4, wherein said communication system comprises a communications antenna.

7. The airbreathing propulsion assisted flight vehicle of claim 1, wherein said elongated portions define a volume for an aerodynamic control system element.

8. The airbreathing propulsion assisted flight vehicle of claim 7, further including an aerodynamic control system.

9. The airbreathing propulsion assisted flight vehicle of claim 8, wherein said aerodynamic control system comprises a spindle for adjusting said control means.

10. The airbreathing propulsion assisted flight vehicle of claim 8, wherein said aerodynamic control system comprises a shaft for adjusting said control means.

11. The airbreathing propulsion assisted flight vehicle of claim 1, wherein said control means comprises thrust vector control (TVC) mechanisms.

12. The airbreathing propulsion assisted flight vehicle of claim 1, wherein said plurality of airbreathing engines comprises ramjet/scramjet engines.

13. The airbreathing propulsion assisted flight vehicle of claim 1, wherein said plurality of airbreathing engines comprises ramjet engines.

14. The airbreathing propulsion assisted flight vehicle of claim 1, wherein said plurality of airbreathing engines comprises scramjet engines.

15. The airbreathing propulsion assisted flight vehicle of claim 1, wherein said central body, comprises:

a payload;

a guidance and control set; and a fuel compartment.

16. The airbreathing propulsion assisted flight vehicle of claim 15, wherein said central body further comprises a braking system.

17. The airbreathing propulsion assisted flight vehicle of claim 15, wherein said central body further comprises a recovery system.

18. The airbreathing propulsion assisted flight vehicle of claim 15, wherein said guidance and control set comprises electrical and electronic components.

19. The airbreathing propulsion assisted flight vehicle of claim 18, wherein said electrical and electronic components comprise an inertial navigation system (INS).

20. The airbreathing propulsion assisted flight vehicle of claim 18, wherein said electrical and electronic components comprise a GPS/INS.

21. The airbreathing propulsion assisted flight vehicle of claim 18, wherein said electrical and electronic components comprise command guidance systems.

22. The airbreathing propulsion assisted flight vehicle of claim 15, wherein said payload, comprises a weapon warhead.

23. The airbreathing propulsion assisted flight vehicle of claim 15, wherein said payload, comprises an unmanned air vehicle (UAV).

24. The airbreathing propulsion assisted flight vehicle of claim 15, wherein said payload, comprises a communications system.

25. The airbreathing propulsion assisted flight vehicle of claim 15, wherein said payload, comprises a surveillance system.

26. The airbreathing propulsion assisted flight vehicle of claim 15, wherein said payload comprises a re-supply system.

27. The airbreathing propulsion assisted flight vehicle of claim 15, wherein said payload comprises a sampling system.

28. The airbreathing propulsion assisted flight vehicle of claim 15, wherein said payload comprises an exploratory system.

29. The airbreathing propulsion assisted flight vehicle of claim 15, further comprising insulation materials positioned around said payload.

30. The airbreathing propulsion assisted flight vehicle of claim 14, further comprising insulation materials positioned around said guidance and control set.

31. The airbreathing propulsion assisted flight vehicle of claim 1, further comprising thermal management and heat reflective materials along exposed surfaces of said combustor and each nozzle means.

32. The airbreathing propulsion assisted flight vehicle of claim 1, further comprising thermal management and heat reflective materials along the aerodynamic leading edges and to portions of said control means thermally exposed to aerodynamic and propulsion heating.

33. The airbreathing propulsion assisted flight vehicle of claim 1, wherein each of said plurality of engines has a propulsive flow path which is isolated from the other engines, said isolation being to at least a portion of each nozzle means.

34. The airbreathing propulsion assisted flight vehicle of claim 1, wherein said plurality of air breathing engines are configured with no moving parts.

* * * * *